(12) United States Patent
Ryu et al.

(10) Patent No.: US 8,195,658 B2
(45) Date of Patent: Jun. 5, 2012

(54) METHOD OF STORING PHONE BOOK DATA IN MOBILE COMMUNICATION TERMINAL AND A MOBILE COMMUNICATION TERMINAL IMPLEMENTING THE SAME

(75) Inventors: Shin-Dong Ryu, Daejeon (KR); Dong-Wook Kwon, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 11/366,507

(22) Filed: Mar. 3, 2006

(65) Prior Publication Data

US 2006/0248465 A1 Nov. 2, 2006

(30) Foreign Application Priority Data

Apr. 28, 2005 (KR) .................. 10-2005-0035719
Nov. 8, 2005 (KR) .................. 10-2005-0106491

(51) Int. Cl.
*G06F 7/00* (2006.01)
*G06F 17/30* (2006.01)
*G06F 15/16* (2006.01)

(52) U.S. Cl. ...................... 707/736; 707/922
(58) Field of Classification Search .......... 707/736, 707/922
See application file for complete search history.

(56) References Cited

U.S. PATENT DOCUMENTS

| | | | | |
|---|---|---|---|---|
| 5,966,714 A | * | 10/1999 | Huang et al. | 707/201 |
| 6,134,548 A | * | 10/2000 | Gottsman et al. | 707/5 |
| 2001/0002469 A1 | * | 5/2001 | Bates et al. | 707/1 |
| 2002/0035556 A1 | * | 3/2002 | Shah et al. | 707/1 |
| 2002/0138582 A1 | * | 9/2002 | Chandra et al. | 709/206 |
| 2003/0069874 A1 | * | 4/2003 | Hertzog et al. | 707/1 |
| 2003/0081375 A1 | | 5/2003 | Yamamoto | |
| 2004/0090552 A1 | | 5/2004 | Watanabe et al. | |
| 2004/0133440 A1 | * | 7/2004 | Carolan et al. | 705/1 |
| 2004/0162036 A1 | | 8/2004 | Park | |

OTHER PUBLICATIONS

Siemens, Siemens Mobile m65, User Manual, 2004, 71 pages, Information and Communications Mobile, Haidenauplatz, Munich.
Microsoft Corporation, Assign a Category to an Item, Technical Paper, Unknown, 1 page, Microsoft Outlook, Online.
University of Wiscosin—Eau Claire, Assigning Contacts to Categories, Technical Paper, 2003, 3 pages, LTS Online Microsoft Outlook, Online.

(Continued)

*Primary Examiner* — Greta Robinson
*Assistant Examiner* — Brian E. Weinrich
(74) *Attorney, Agent, or Firm* — Roylance, Abrams, Berdo & Goodman, LLP (57) ABSTRACT

A method and mobile communication terminal for storing phone book data in the mobile communication terminal are provided in which phone book data can be registered group-by-group, where a predetermined is selected group among the registered groups in response to a user's request, and at least one of phone book data stored in the selected group is moved and stored into a group assigned by the user when a phone book data movement request is input by the user. Accordingly, a plurality of phone book data stored in a predetermined group among phone book data stored in a group basis in a mobile communication terminal can be easily moved and stored into another group. In addition, since the user can easily store phone book data whose group is not identified in a predetermined group, user convenience improves.

6 Claims, 11 Drawing Sheets

OTHER PUBLICATIONS

Lee Kroon, Microsoft Release Office 2003, Technical Paper, Oct. 26, 2003, 5 pages, Microsoft Press Online, Online.

Sprint Communications Company, Online User's Guide PCS Phone Handspring Treo™ 300, User Manual, 2002, 286 pages, Sprint Spectrum L.P., Unknown.

Compaq Computer Corporation, Compaq IPAQ Pocket PC H3800 Series, User Manual, Sep. 1, 2001, 6 pages, First Edition, Compaq, Unknown.

Publishing House of Electronics Industry, Feb. 2001, E-mail Online, Feb. 1, 2001; pp. 172,173.

* cited by examiner

METHOD OF STORING PHONE BOOK DATA IN MOBILE COMMUNICATION TERMINAL AND A MOBILE COMMUNICATION TERMINAL IMPLEMENTING THE SAME

PRIORITY

This application claims the benefit under 35 U.S.C. §119(a) of Korean Patent Applications filed in the Korean Intellectual Property Office on Apr. 28, 2005 and Nov. 8, 2005 and assigned Serial Nos. 2005-35719 and 2005-106491, the entire disclosure of both of which are hereby incorporated by reference.

BACKGROUND OF THE INVENTION

1. Field of the Invention

The present invention relates generally to a mobile communication terminal. More particularly, the present invention relates to a method and mobile communication terminal for storing phone book data in the mobile communication terminal.

2. Description of the Related Art

Commonly, a "mobile communication terminal" refers to a device which a user can make a call or exchange data with another party while carrying a cellular phone, Personal Digital Assistant (PDA), Personal Communication Services (PCS) phone, International Mobile Telecommunication (IMT)-2000 terminal or Global System for Mobile communication (GSM) terminal.

Such mobile communication terminals are being recognized as necessities. The tendency of mobile communication terminals is toward miniaturizing, slimming and light-weighing when considering portability, and having multimedia capabilities including various functions that can be pursued.

Mobile communication terminals originally introduce a phone call function, short message service function, memory function, which a user can store and search for phone book data such as telephone numbers, lock function, alarm function, area number identification function, and various additional functions recently added, such as, camera function, digital broadcast receive function, game function, and the like.

The memory function for storing phone book data out of the various functions described above provides convenience to users.

When a user stores phone book data, such as telephone numbers, in a mobile communication terminal having the additional functions, the user generally stores the phone book data by identifying predetermined groups and storing the phone book data per identified group (for example, co-workers, friends, home friends, and the like). If the phone book data does not belong to any identified group, the user stores the data by separately storing the phone book data in an unidentified group.

However, when the user wants to move and store a large amount of phone book data among phone book data stored in a predetermined group of the mobile communication terminal into another group, the user must inconveniently select relevant phone book data one-by-one and move and store the selected phone book data into a desired group. That is, the user cannot move and store the large amount of phone book data into the desired group at once. This is also applied to the moving and storing of phone book data stored in the unidentified group into another group.

Thus, when the user wants to move and store a large amount of phone book data stored in a predetermined group into another group, many key operations are required, and an increase of phone book data results in an increase of key operations, time waste, and inconvenience.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and mobile communication terminal for more easily moving and storing a large amount of phone book data stored in a predetermined group into another group in the mobile communication terminal in which phone book data is registered group-by-group.

Another object of an exemplary embodiment of the present invention is to provide a method of easily storing phone book data, which is not registered in a group, in a predetermined group in a mobile communication terminal where phone book data is registered group-by-group.

According to one aspect of exemplary embodiments of the present invention, there is provided a method and mobile communication terminal for storing phone book data in the mobile communication terminal in which phone book data can be registered group-by-group, where a predetermined group among the registered groups is selected in response to a user's request, and at least one of phone book data stored in the selected group is moved and stored into a group assigned by the user when a phone book data movement request is input by the user.

According to another aspect of exemplary embodiments of the present invention, there is provided a method and mobile communication terminal for storing phone book data in a mobile communication terminal in which phone book data can be registered group-by-group, where stored phone book data in response to a user's phone book data display request is displayed, if a phone book data movement request is input by the user, at least one phone book data in response to the user's selection information is selected, and if at least one phone book data is selected, the selected phone book data into a group assigned by the user is moved and stored.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same reference numerals will be understood to refer to the same elements, features, and structures

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
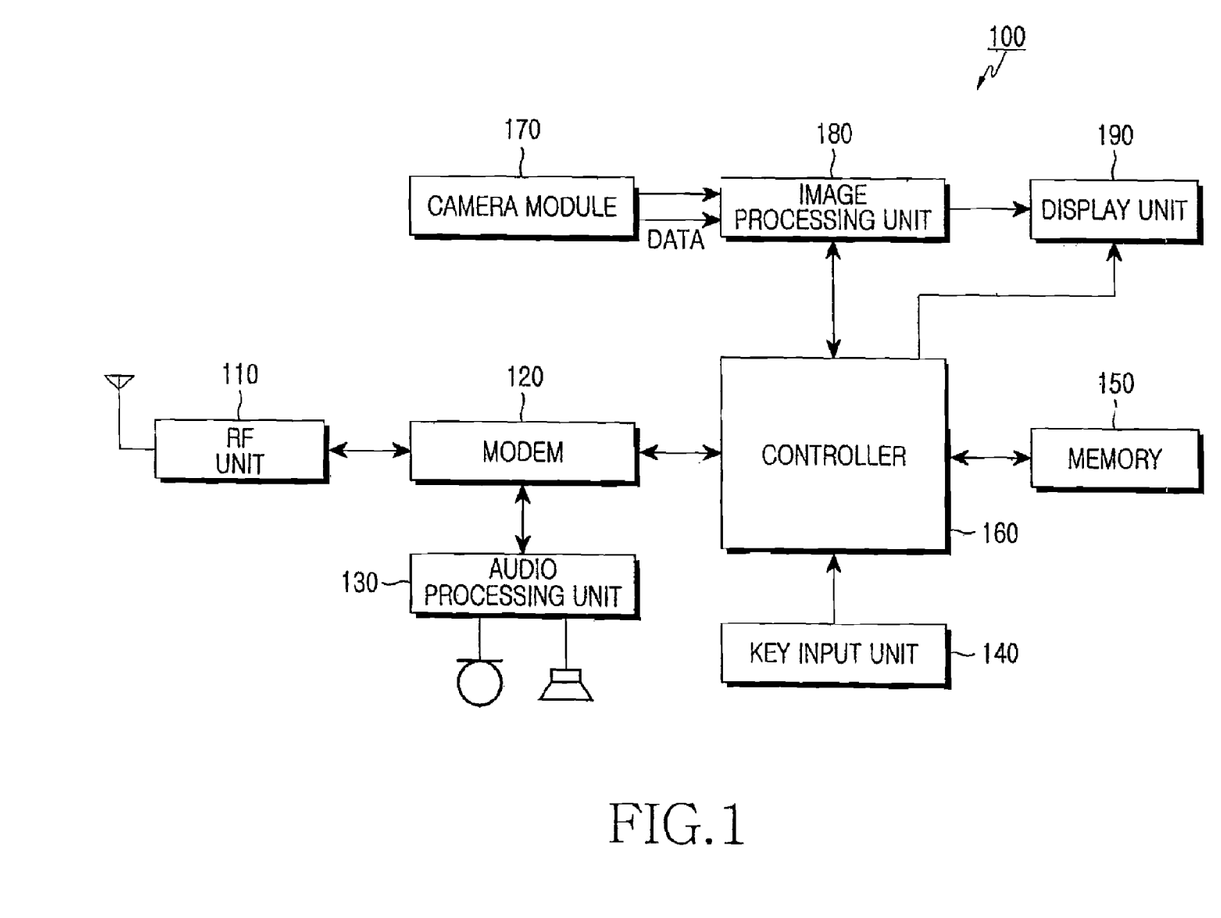
FIG. 1 is a block diagram of a mobile communication terminal according to an exemplary embodiment of the present invention.

FIG. 1 is a block diagram of a mobile communication terminal 100 according to an exemplary embodiment of the present invention.

The mobile communication terminal 100 illustrated in FIG. 1 includes a radio frequency (RF) transceiver 110, modem 120, audio processing unit 130, key input unit 140, memory 150, controller 160, camera module 170, image processing unit 180, and display unit 190.

Referring to FIG. 1, the controller 160 controls the RF unit 110 to transmit/receive voice data, character data, image data, and control data. To do this, the RF unit 110 includes an RF transmitter, which up-converts a frequency of a signal to be transmitted and amplifies the up-converted signal, and an RF receiver, which low noise amplifies a received signal and down-converts a frequency of the low noise amplified signal.

The modem 120 includes a transmitter encoding and modulating the signal to be transmitted and a receiver demodulating and decoding the received signal.

The audio processing unit 130 may include a codec, which includes a data codec processing packet data and an audio codec processing an audio signal.

The audio processing unit 130 modulates an electrical signal input from a microphone to voice data, and demodulates encoded voice data input from the RF unit 110 to an electrical signal and then outputs the demodulated electrical signal to a speaker. In an exemplary implementation, the audio processing unit 130 includes the codec to convert a digital audio signal input from the RF unit 110 to an analog audio signal and reproduce the converted analog audio signal, or to convert an analog audio signal input from the microphone to a digital audio signal. The codec includes a data codec processing packet data and the audio codec processing an audio signal and may be included in the controller 160.

The key input unit 140 has a key matrix structure, which includes character keys, numeral keys, various function keys, and separate volume keys, and outputs a key input signal corresponding to a key pressed by a user to the controller 160.

The memory 150 may include a program memory and a data memory. The memory 150 stores various information required to control an operation of the mobile communication terminal 100 according to an exemplary embodiment of the present invention, various information selected by a user selection information, and user storage information. That is, the memory 150 includes Read Only Memory (ROM) storing an operating algorithm accessed through the controller 160 for a general operation of the mobile communication terminal 100 and Random Access Memory (RAM) storing data according to control instructions in a data processing process of the controller 160.

The user storage information includes user's memos, a call history list, telephone directory (that is, phone book data), transmitted/received messages, image data, and music data.

The controller 160 controls a general operation of the mobile communication terminal 100. When a phone book data display request is input by the user through a key input or a voice input, the controller 160 displays the phone book data stored in the memory 150 on the display unit 190 in a group basis.

The controller 160 selects a predetermined group from the displayed groups in response to user selection information (for example, a key input). When a phone book data movement request is input by the user, the controller 160 switches an operation mode of the mobile communication terminal 100 to a phone book data movement mode.

When at least one of phone book data stored in the selected group is selected in response to user selection information (for example, a direction key input) in the phone book data movement mode, the controller 160 moves and stores the selected at least one phone book data into a group assigned by the user. When the phone book data movement request is input by the user, the controller 160 may move and store all phone book data of the selected group into the assigned group or into a group newly created by the user's request.

When a phone book data display request is input by the user, the controller 160 displays the phone book data stored in the memory 150 on the display unit 190. In an exemplary implementation, the phone book data displayed on the display unit 190 may be arranged in alphabet order of names and displayed.

When a phone book data movement request is input by the user, the controller 160 switches the operation mode of the mobile communication terminal 100 to the phone book data movement mode.

When at least one of phone book data displayed on the display unit 190 is selected in response to user selection information in the phone book data movement mode, the controller 160 moves and stores the selected phone book data into a group assigned by the user or created by the user's request.

The camera module 170 may include a lens module, which can extend out and withdraw into the camera module 170, and photographs an image. The camera module 170 also includes a camera sensor (not shown) converting an optical signal obtained through the photographing to an electrical signal and a signal processing unit (not shown) converting an analog image signal input generated by the camera sensor to digital data.

The camera sensor, for example, may be a charge coupled device (CCD) sensor, and the signal processing unit may be implemented using a digital signal processor (DSP). The camera sensor and the signal processing unit may be implemented in one body or separately.

The image processing unit 180 generates image data for displaying an image signal output from the camera module 170.

The image processing unit 180 processes the image signal output from the camera module 170 frame-by-frame, fits the processed frame image data to the characteristic and size of the display unit 190, and outputs the result to the display unit 190. The image processing unit 180 includes an image codec, thereby compressing the image data displayed on the display unit 190 in a pre-set method or decompressing the compressed image data into original frame image data.

In addition, the image processing unit 180, for example, may include an On Screen Display (OSD) function. Thereby, the controller 160 may control the image processing unit 180 to output OSD data according to the size of a displayed image.

The display unit 190 may include a liquid crystal display (LCD) and displays various display data generated by the mobile communication terminal 100. When the LCD is implemented in a touch screen method, the display unit 190 may operate as an input unit.

The display unit 190 also displays an image signal output from the image processing unit 180 as an image and displays user data output from the controller 160.

Figure 2:
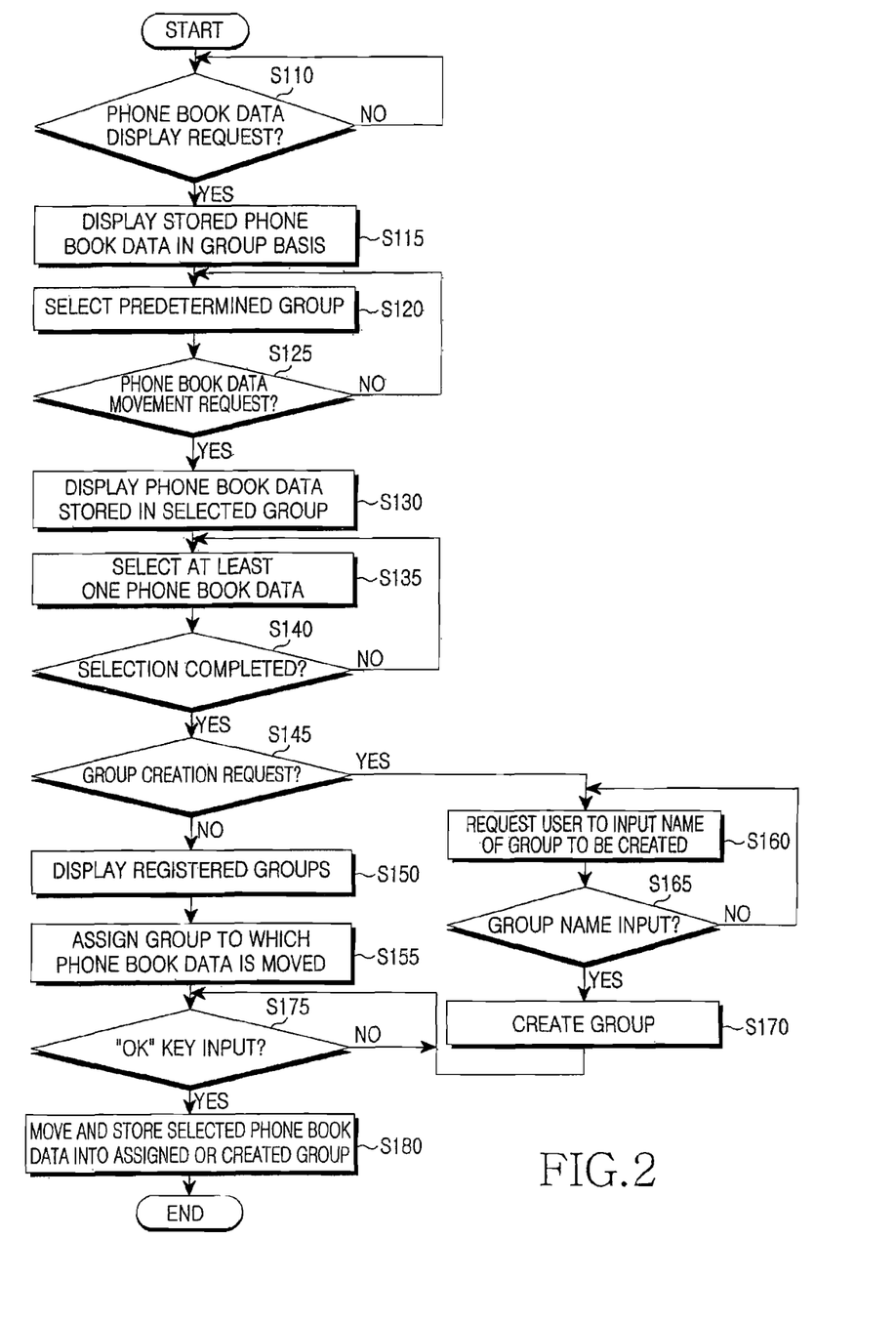
FIG. 2 is a flowchart of a method of storing phone book data in a mobile communication terminal according to an exemplary embodiment of the present invention.

FIG. 2 is a flowchart of an operation of a mobile communication terminal according to an exemplary embodiment of the present invention. Phone book data may be registered group-by-group in the mobile communication terminal according to an exemplary embodiment of the present invention. Accordingly, when a user of the mobile communication terminal stores phone book data, the user stores the phone book data by assigning a predetermined group or, if no group corresponding to the phone book data exists, separately stores the phone book data in an unidentified group.

Referring to FIGS. 1 and 2, in step S110, the controller 160 determines whether a phone book data display request is input by the user.

If the phone book data display request is input by the user, in step S115, the controller 160 displays phone book data stored in the memory 150 on the display unit 190 in a group basis.

In step S120, the controller 160 selects a predetermined group among the groups displayed on the display unit 190 in response to user selection information (for example, a key input).

When the predetermined group is selected, in step S125, the controller 160 determines whether a phone book data movement request is input by the user. The user may input the phone book data movement request through a menu key input and may input the phone book data movement request using a key included in the key input unit 140. In an exemplary implementation, the key input unit 140 may include a specific key for the phone book data movement request.

If the phone book data movement request is input by the user, in step S130, the controller 160 switches the operation mode of the mobile communication terminal 100 to the phone book data movement mode, reads the phone book data stored in the selected predetermined group from the memory 150, and displays the read phone book data on the display unit 190.

In step S135, the controller 160 selects at least one of the phone book data displayed on the display unit 190 in response to user selection information. The controller 160 may select phone book data every time the user presses a key set for item selection (for example, a selection key) after selecting a desired phone book data item using a direction key or volume key. In addition, the controller 160 additionally implements a selection flag in front of each of the displayed phone book data so that the user can recognize the selected phone book data. In an exemplary implementation, the controller 160 marks the implemented selection flag every time the user selects phone book data so that the user can check the selected phone book data.

In step S140, the controller 160 determines whether the phone book data selection is completed. The controller 160 determines that the phone book data selection is completed if an "OK" key is pressed after at least one phone book data is selected.

If the phone book data selection is completed, in step S145, the controller 160 determines whether a group creation request is input by the user. That is, the controller 160 displays an image on the display unit 190 for asking the user to select whether a new group is created together with a message, for example, "Do you want to create a new group?".

If the group creation request is not input, in step S150, the controller 160 displays on the display unit 190 groups stored in the memory 150, such as, a family group, friend group, co-worker group, unidentified group, and the like.

In step S155, the controller 160 assigns a group where the selected phone book data is moved in response to user selection information. For example, the user can assign the group where the selected phone book data is moved by operating a direction key.

In step S175, the controller 160 determines whether the "OK" key is pressed. If the "OK" key is pressed, in step S180, the controller 160 moves and stores the selected phone book data into a destination group, that is, the assigned group.

If the group creation request is input in step S145, the controller 160 requests the user to input the name of a group to be created, in step S160. The controller 160 may output the group name input request using a voice or short message.

In step S165, the controller 160 determines whether the requested group name is input. If the group name is input, in step S170, the controller 160 creates a group having the input group name.

In step S175, the controller 160 determines whether the "OK" key is pressed. If the "OK" key is pressed, in step S180, the controller 160 moves and stores the selected phone book data into a destination group, that is, the created group.

On the other hand, when the phone book data movement request is input by the user in step S125, the controller 160 may display all groups registered in the memory 150 on the display unit 190. In this instance, the controller 160 may assign a predetermined group where phone book data is moved among the displayed groups. If the "OK" key is pressed, the controller 160 move and store all phone book data stored in the selected predetermined group into the assigned group.

FIGS. 3A to 3H are illustrations for explaining an operation of the mobile communication terminal 100 according to an exemplary embodiment of the present invention.

Figure 3A:
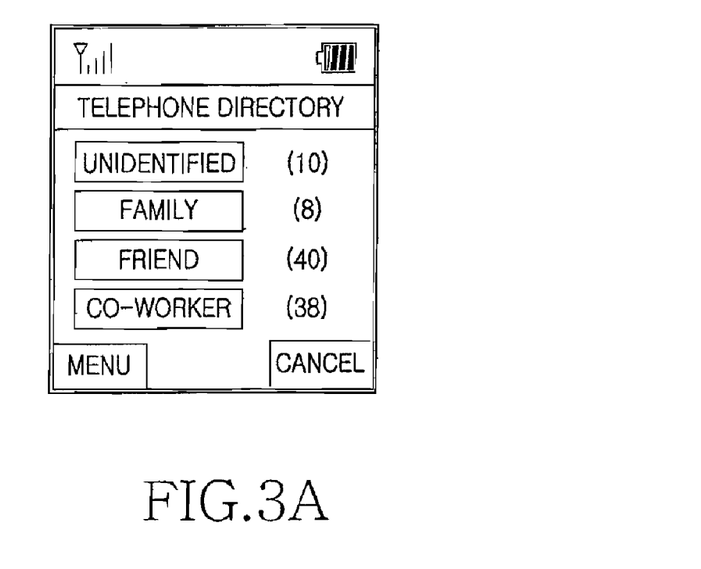
FIGS. 3A to 3H are illustrations for explaining an operation of a mobile communication terminal according to an exemplary embodiment of the present invention.

When the phone book data display request is input by the user, the mobile communication terminal 100 displays stored phone book data in a group basis as illustrated in FIG. 3A. That is, FIG. 3A illustrates an "unidentified" group, "family" group, "friend" group, and "co-worker" group, which are registered in the telephone directory (that is, phone book), according to a key operation of the user and illustrates the number of phone book data items stored in each of the groups.

That is, FIG. 3A illustrates that 10 phone book data items are stored in the "unidentified" group, 8 in the "family" group, 40 in the "friend" group, and 38 in the "co-worker" group.

Figure 3B:
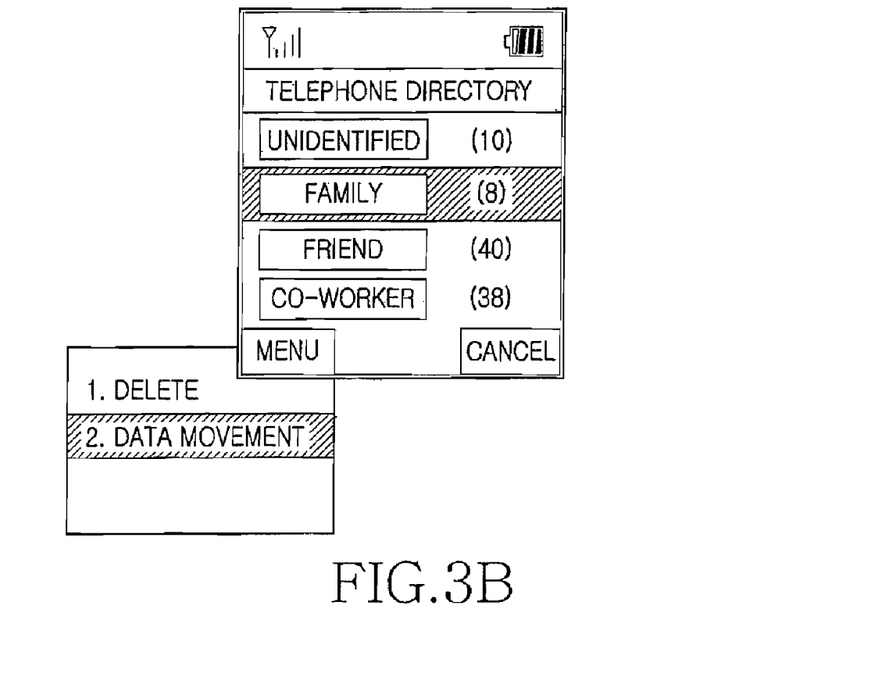
Figure 3C:
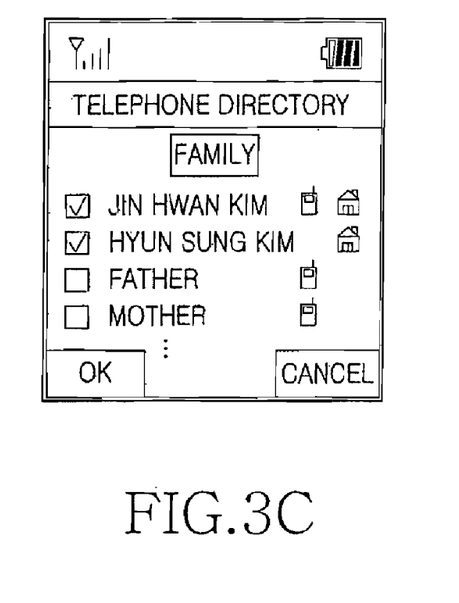

When the user selects the "family" group, selects "2. data movement" in the menu through a menu key input, and presses the "OK" key as illustrated in FIG. 3B, the mobile communication terminal 100 displays 8 phone book data items (for example, "Jin Hwan Kim," "Hyun Sung Kim," "father," "mother," . . . ) stored in the "family" group as illustrated in FIG. 3C.

FIG. 3C illustrates the selection of two phone book data items (for example, "Jin Hwan Kim" and "Hyun Sung Kim") among the displayed phone book data items (for example, "Jin Hwan Kim," "Hyun Sung Kim," "father," "mother," . . . ) according to a key operation of the user. Selection flags for checking items selected in response to the user's selection information are implemented for the displayed phone book data items.

Figure 3D:
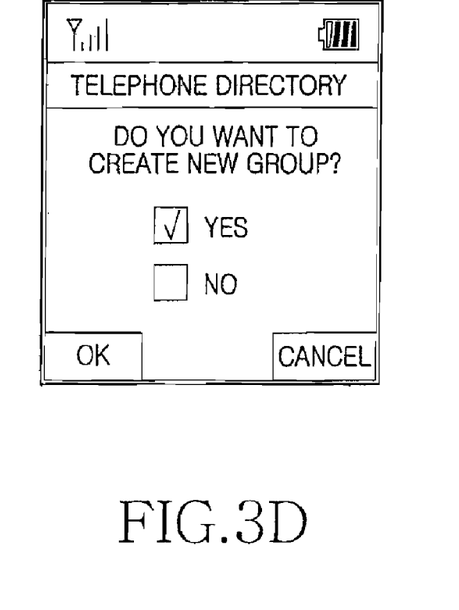

If the user's phone book data selection is completed (that, if the "OK" key is pressed) in FIG. 3C, the mobile communication terminal 100 displays an image for asking the user to select whether a new group is created together with a message, for example, "Do you want to create a new group?," as illustrated in FIG. 3D.

Figure 3E:
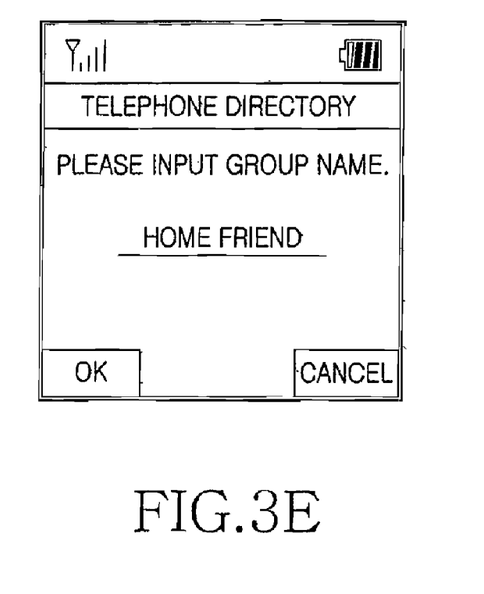

If the user selects a group creation request and presses the "OK" key in FIG. 4D, the mobile communication terminal 100 displays an image for requesting the user to input the name of a group to be created as illustrated in FIG. 3E.

Figure 3F:
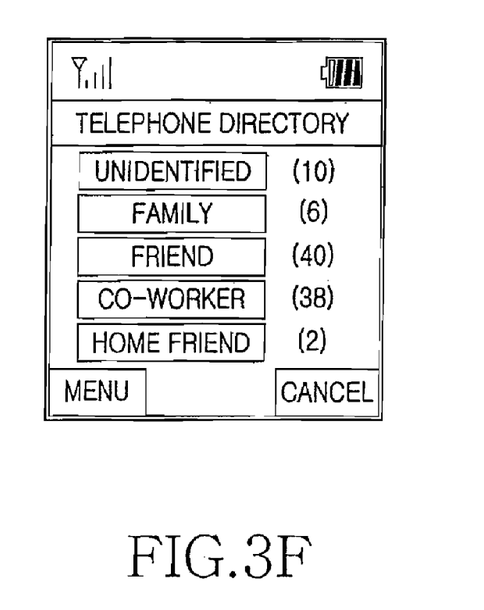

If the user inputs the name of a group to be created, for example, "home friend" and presses the "OK" key in FIG. 3E, the mobile communication terminal 100 creates a "home friend" group and moves and stores the selected phone book data into the created group. FIG. 3F indicates that the two selected phone book data items among the phone book data stored in the "family" group have been moved to the newly created "home friend" group.

Figure 3G:
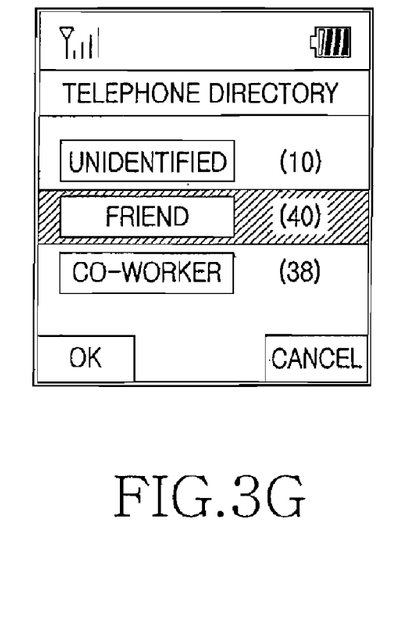

It the user presses the "OK" key without the group creation request in FIG. 3D, the mobile communication terminal 100 displays the groups (that is, the "unidentified" group, "friend" group, and "co-worker" group) registered in the memory 150 as illustrated in FIG. 3G. When displaying the groups, the mobile communication terminal 100 may display the groups except the group storing the selected phone book data.

If the user selects the "friend" group as a group where the selected phone book data is moved and presses the "OK" key in FIG. 3G, the mobile communication terminal 100 moves and stores the selected phone book data into the "friend" group. That is, the mobile communication terminal 100 moves and stores the selected phone book data "Jin Hwan Kim" and "Hyun Sung Kim" among the phone book data stored in the "family" group into the "friend" group.

Figure 3H:
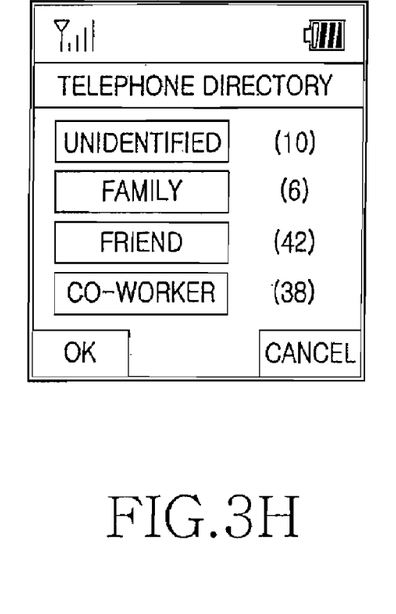

FIG. 3H indicates that the two selected phone book data items among the phone book data stored in the "family" group have been moved to the "friend" group. Comparing FIG. 3A to FIG. 3H, it can be known that the number of phone book data items stored in the "family" group is 8 and the number of phone book data items stored in the "friend" group is 40 in FIG. 3A. However, after performing the process of FIG. 2, the number of phone book data items stored in the "family" group is changed to 6 and the number of phone book data items stored in the "friend" group is changed to 42 in FIG. 3H.

According to an exemplary embodiment of the present invention described above, the user can easily move and store a plurality of phone book data items stored in a predetermined group among phone book data stored in a group basis in the mobile communication terminal 100 into another group or a newly created group.

Figure 4:
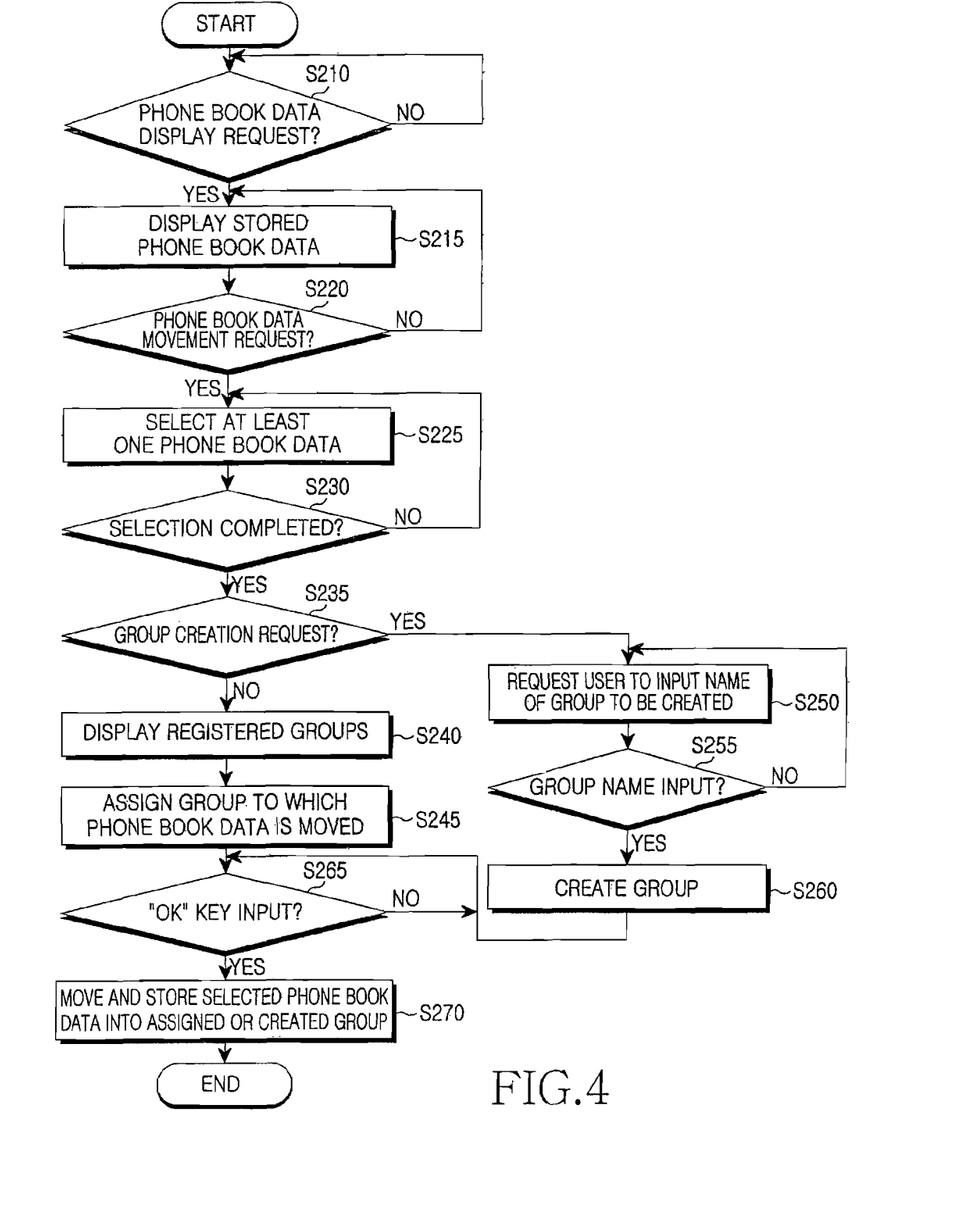
FIG. 4 is a flowchart of a method of storing phone book data in a mobile communication terminal according to an exemplary embodiment of the present invention.

FIG. 4 is a flowchart of an operation of the mobile communication terminal 100 according to an exemplary embodiment of the present invention.

Referring to FIGS. 1 and 4, in step S210, the controller 160 determines whether a phone book data display request is input by the user.

If the phone book data display request is input by the user, in step S215, the controller 160 displays phone book data stored in the memory 150 on the display unit 190.

In step S220, the controller 160 determines whether a phone book data movement request is input by the user. In an exemplary implementation, the user inputs the phone book data movement request through a menu key input, the key input unit 140 may include a specific key for the user's phone book data movement request.

If the phone book data movement request is input by the user, in step S225, the controller 160 switches the operation mode of the mobile communication terminal 100 to the phone book data movement mode and selects at least one of the phone book data displayed on the display unit 190 in response to user selection information. In an exemplary implementation, the controller 160 may select phone book data every time the user presses a key set for item selection (for example, a selection key) after selecting a desired phone book data item using a direction key or volume key. In addition, the controller 160 may additionally implement a selection flag in front of each of the displayed phone book data so that the user recognizes the selected phone book data. In this instance, the controller 160 marks the implemented selection flag every time the user selects phone book data so that the user can check the selected phone book data.

In step S230, the controller 160 determines whether the phone book data selection is completed. The controller 160 determines that the phone book data selection is completed, if the "OK" key is pressed after at least one phone book data is selected.

If the phone book data selection is completed, in step S235, the controller 160 determines whether a group creation request is input by the user. That is, the controller 160 may display an image for asking the user to select whether a new group is created together with a message, for example, "Do you want to create a new group?," on the display unit 190.

If the group creation request is not input, in step S240, the controller 160 displays groups stored in the memory 150 (for example, a family group, friend group, co-worker group, unidentified group, and the like) on the display unit 190. The groups are generated by the user to classify and store the phone book data when the user initially stores the phone book data.

In step S245, the controller 160 assigns a group where the selected phone book data is moved in response to user selection information. For example, the user can assign the group where the selected phone book data is moved by operating the direction key.

In step S265, the controller 160 determines whether the "OK" key is pressed. If the "OK" key is pressed, in step S270, the controller 160 moves and stores the selected phone book data into a destination group, that is, the assigned group.

If the group creation request is input in step S235, the controller 160 requests the user to input the name of a group to be created in step S250. The controller 160 may output the group name input request using a voice or short message.

In step S255, the controller 160 determines whether the requested group name is input. If the group name is input, in step S260, the controller 160 creates a group having the input group name.

In step S265, the controller 160 determines whether the "OK" key is pressed. If the "OK" key is pressed, in step S270, the controller 160 moves and stores the selected phone book data into a destination group, that is, the created group.

FIGS. 5A to 5G are illustrations for explaining an operation of the mobile communication terminal 100 according to an exemplary embodiment of the present invention.

FIGS. 5A to 5G will now be described with reference to FIGS. 1 and 4.

Figure 5A:
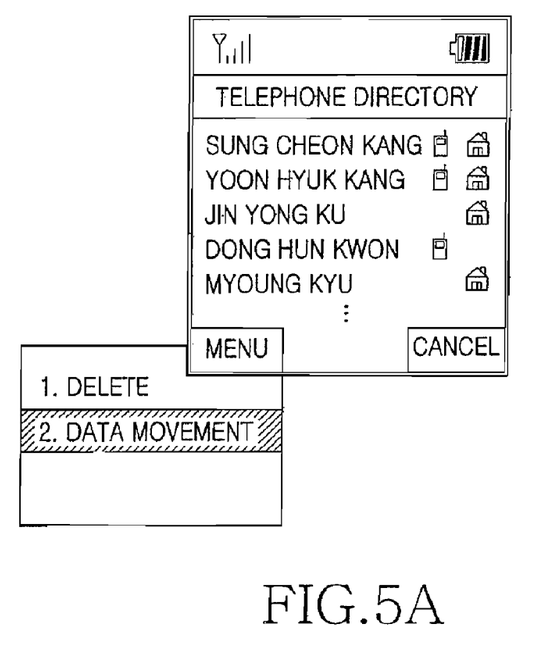
FIGS. 5A to 5G are illustrations for explaining an operation of a mobile communication terminal according to an exemplary embodiment of the present invention.

When the phone book data display request is input by the user, the mobile communication terminal 100 displays stored phone book data as illustrated in FIG. 5A. That is, FIG. 5A illustrates phone book data (for example, "Sung Cheon Kang," "Yoon Hyuk Kang," "Jin Yong Ku," "Dong Hun Kwon," "Myoung Kyu," . . . ) registered in the telephone directory (that is, phone book) according to a key operation of the user. In an exemplary implementation, the phone book data is not stored in any specific group.

Figure 5B:
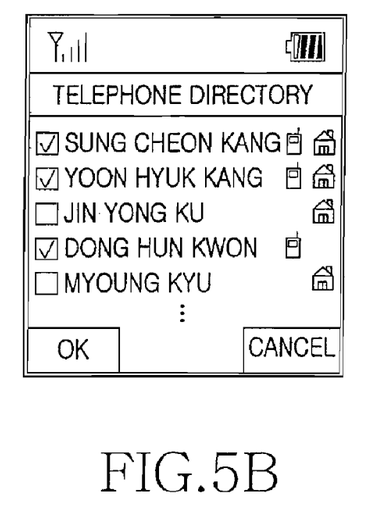

When the user selects in the menu "2. data movement" through a menu key input and presses the "OK" key in FIG. 5A, the mobile communication terminal 100 displays an image for selecting phone book data to be moved by the user as illustrated in FIG. 5B.

FIG. 5B illustrates the selection of two phone book data items (that is, "Sung Cheon Kang," "Yoon Hyuk Kang," and "Dong Hun Kwon") among the displayed phone book data items (that is, "Sung Cheon Kang," "Yoon Hyuk Kang," "Jin Yong Ku," "Dong Hun Kwon," "Myoung Kyu," . . . ) according to a key operation of the user. Selection flags for checking items selected in response to the user's selection information are implemented for the displayed phone book data items.

Figure 5C:
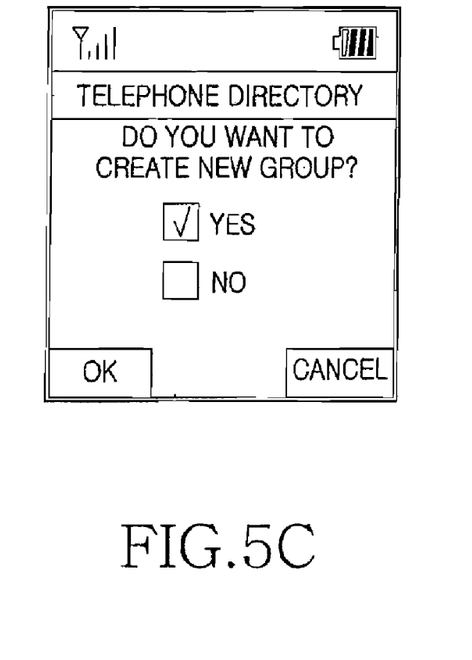

If the user's phone book data selection is completed (for example, if the "OK" key is pressed) in FIG. 5B, the mobile communication terminal 100 displays an image for asking the user to select whether a new group is created together with a message, for example, "Do you want to create a new group?," as illustrated in FIG. 5C.

Figure 5D:
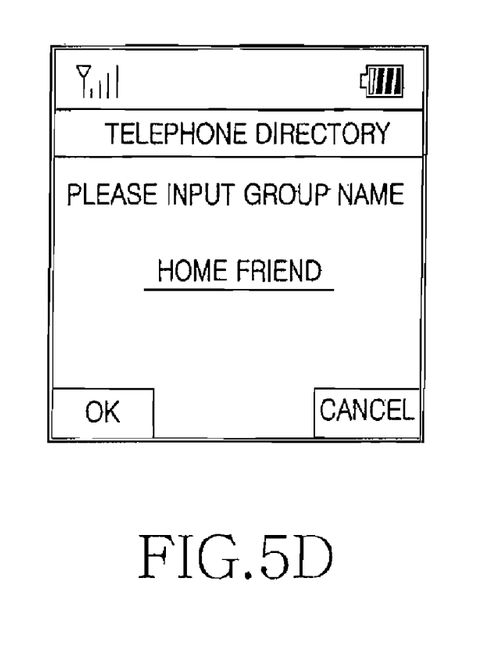

If the user selects a group creation request and presses the "OK" key in FIG. 5C, the mobile communication terminal 100 displays an image for requesting the user to input the name of a group to be created as illustrated in FIG. 5D.

Figure 5E:
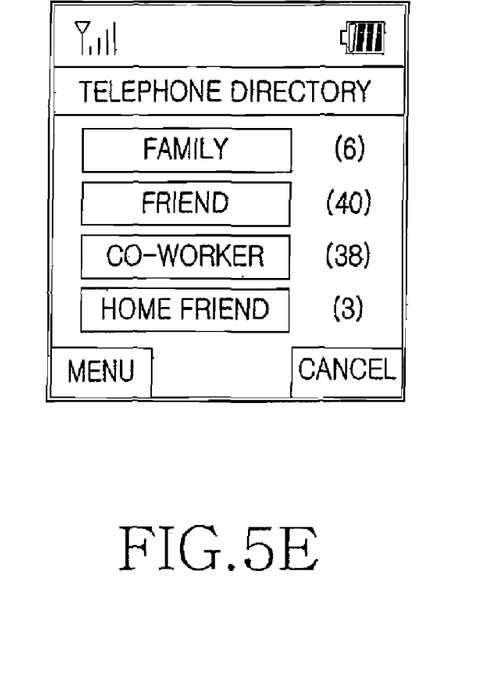

If the user inputs the name of a group to be created, for example, "home friend" and presses the "OK" key in FIG. 5D, the mobile communication terminal 100 creates a "home friend" group and moves and stores the selected phone book data into the created group. FIG. 5E indicates that the three selected phone book data items have been moved to the newly created "home friend" group.

Figure 5F:
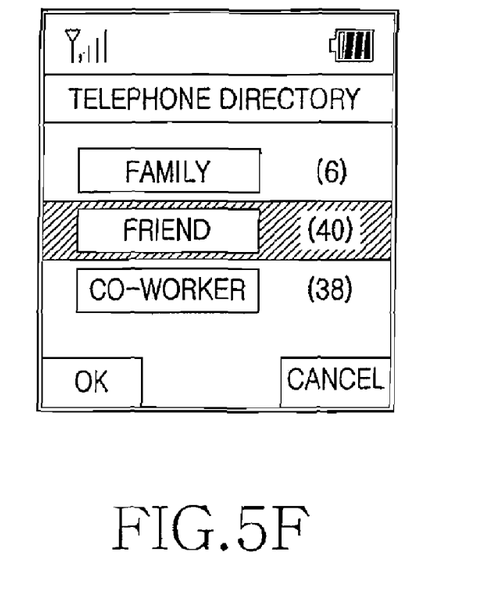

It the user presses the "OK" key without the group creation request in FIG. 5C, the mobile communication terminal 100 displays groups (for example, a "family" group, "friend" group, and "co-worker" group) registered in the memory 150 as illustrated in FIG. 5F.

If the user selects the "friend" group as a group where the selected phone book data is moved and presses the "OK" key in FIG. 5F, the mobile communication terminal 100 moves and stores the selected phone book data into the "friend" group. That is, the mobile communication terminal 100 moves and stores the selected phone book data "Sung Cheon Kang," "Yoon Hyuk Kang," and "Dong Hun Kwon" among the phone book data displayed in FIG. 5B into the "friend" group.

Figure 5G:
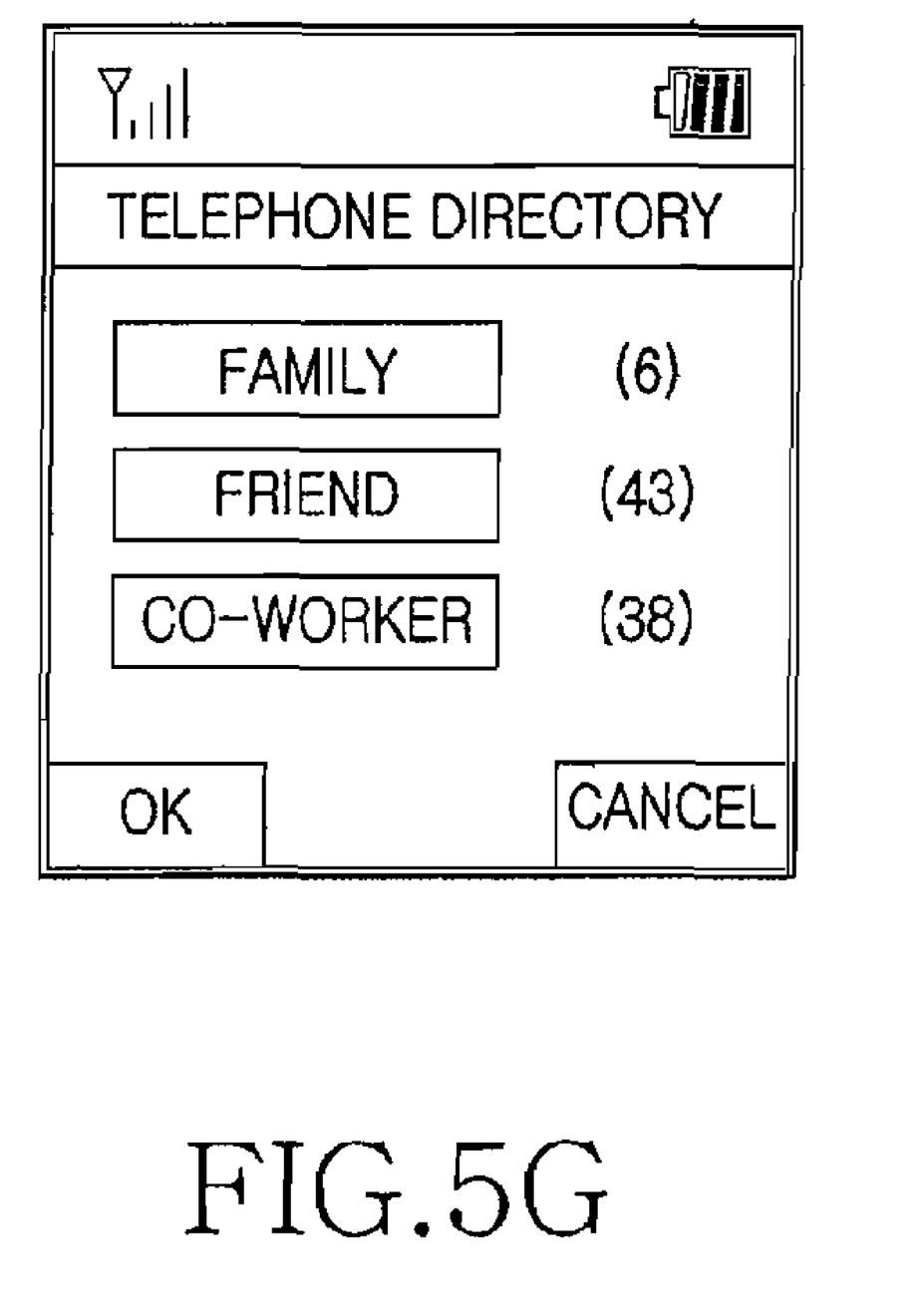

FIG. 5G indicates that the three phone book data items selected in FIG. 5B have been moved to the "friend" group. Comparing FIG. 5F to FIG. 5G, it can be known that the number of phone book data items stored in the "friend" group is 40 in FIG. 5F, however after performing the process of FIG. 4, the number of phone book data items stored in the "friend" group is changed to 43 in FIG. 5G.

According to exemplary embodiments of the present invention described above, since the user can easily store phone book data whose group is not identified in a predetermined group, user convenience increases.

As described above, according to exemplary embodiments of the present invention, a plurality of phone book data stored in a predetermined group among phone book data stored in a group basis in a mobile communication terminal can be easily moved and stored into another group.

In addition, since the user can easily store phone book data whose group is not identified in a predetermined group, user convenience increases.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A method of storing phone book data in a mobile communication terminal, the method comprising:

in response to input from a user via a key input on a mobile communication terminal having a plurality of registered data groups, selecting a phone book data entry from the phone book data in the mobile communication terminal;

in response to selecting the phone book data entry, displaying the registered data groups in a main window area on the mobile communication terminal;

in response to input from a user via a key input on the mobile communication terminal, selecting one of the displayed registered data groups; and moving and storing the selected phone book data entry to the selected registered data group in the mobile communication terminal, wherein a remaining window area other than the main window area comprises display functions related to function keys and information related to the operation of the mobile communication terminal, and wherein the storing the selected phone book data entry comprises:

displaying the phone book data stored in the selected registered data group, when the movement of the phone book data is requested;

displaying the registered data groups, when at least one of the displayed phone book data entries is selected in response to selection information;

assigning a selected registered data group comprising the selected phone book data entry moved in response to the selection;

moving and storing the selected phone book data into the selected registered data group, if confirmed;

requesting input of a name of a group to be created, if a group creation is requested where the registered data groups are displayed; and creating a group comprising the input group name, if the group name is input; and moving and storing the selected phone book data entry into the created group if confirmed.

2. The method of claim 1, wherein the storing the selected phone book data entry comprises:

displaying the registered data groups, if the phone book data entry movement is requested;

assigning a group comprising the selected phone book data entry moved in response to the selection; and moving and storing the selected phone book data entry stored in the selected group into the assigned group, if confirmed.

3. A method of storing phone book data in a mobile communication terminal, the method comprising:

displaying the phone book data having one or more phone book data entries in a mobile communication terminal in response to a phone book data display request, the phone book data having a plurality of registered data groups;

selecting at least one of the phone book data entries, when a phone book data movement is requested;

in response to selecting the phone book data entry, displaying the registered data groups;

selecting one of the displayed registered data groups; and moving and storing the selected phone book data entry into the selected registered data group, wherein the storing the selected phone book data comprises:

associating the selected phone book data entry with the selected registered data group;

moving and storing the at least one phone book data into the selected registered data group, if confirmed;

requesting input of a name of a registered data group to be created, if a registered data group creation is requested where the registered data groups are displayed;

creating a registered data group comprising the input group name, if the group name is input; and moving and storing the selected phone book data into the created registered data group, if confirmed.

4. The method of claim 3, wherein the displaying of the phone book data comprises displaying the phone book data not being associated with the registered data groups, if the phone book data display request is input.

5. A mobile communication terminal comprising:
- a display unit in a mobile communication terminal for displaying phone book data having one or more phone book data entries in response to a phone book data display request, the phone book data having a plurality of registered data groups;
- a key input unit for selecting one of the displayed phone book data entries in response to a selection; and
- a controller for, after selecting the displayed phone book data entry, displaying the registered data groups, selecting one of the registered data groups, and moving and storing the selected phone book data entry into the selected data group,
- wherein when at least one of the one or more phone book data entries is selected, the controller displays the registered data groups in the display unit for storing the selected display phone book data, and moves and stores the selected phone book data entry into one of the registered data groups, and
- wherein, if a registered data group creation is requested where the registered data groups are displayed, the controller creates a new registered data group, and moves and stores the selected phone book data entry into the new registered data group.

6. The mobile communication terminal of claim 5, wherein the controller displays the one or more phone book data entries not being associated with the registered data groups in the display unit in response to a phone book data display request.

* * * * *